United States Patent
Mohan

(10) Patent No.: US 8,271,357 B2
(45) Date of Patent: Sep. 18, 2012

(54) PRESENTING ITEMS BASED ON ACTIVITY RATES

(75) Inventor: Sunil Mohan, Los Gatos, CA (US)

(73) Assignee: eBay Inc., San Jose, CA (US)

( * ) Notice: Subject to any disclaimer, the term of this patent is extended or adjusted under 35 U.S.C. 154(b) by 1023 days.

(21) Appl. No.: 12/001,283

(22) Filed: Dec. 11, 2007

(65) Prior Publication Data

US 2009/0150214 A1 Jun. 11, 2009

(51) Int. Cl.
G06Q 30/00 (2012.01)
(52) U.S. Cl. ............ 705/27.1; 705/7.11; 705/7.29; 705/14.49; 705/14.51; 705/26.1; 705/26.61; 705/26.7
(58) Field of Classification Search ........ 705/26.1–27.2, 705/14.4–14.73, 7.11, 7.29–7.35; 707/706–788
See application file for complete search history.

(56) References Cited

U.S. PATENT DOCUMENTS

| | | | |
|---|---|---|---|
| 6,081,774 A | 6/2000 | de Hita et al. | |
| 6,101,486 A | 8/2000 | Roberts et al. | |
| 6,338,055 B1 | 1/2002 | Hagmann et al. | |
| 6,463,428 B1 | 10/2002 | Lee et al. | |
| 6,999,957 B1 | 2/2006 | Zamir et al. | |
| 7,031,961 B2 | 4/2006 | Pitkow et al. | |
| 7,257,577 B2 | 8/2007 | Fagin et al. | |
| 7,295,995 B1* | 11/2007 | York et al. | 705/26.8 |
| 7,689,450 B1* | 3/2010 | Dvorak et al. | 705/7.31 |
| 7,778,890 B1 | 8/2010 | Bezos et al. | |
| 7,779,014 B2* | 8/2010 | York et al. | 707/748 |
| 7,783,631 B2* | 8/2010 | Korn et al. | 707/726 |
| 7,818,319 B2* | 10/2010 | Henkin et al. | 707/726 |
| 7,953,739 B2* | 5/2011 | York et al. | 707/749 |
| 2001/0021914 A1 | 9/2001 | Jacobi et al. | |
| 2002/0077930 A1 | 6/2002 | Trubey et al. | |
| 2003/0065655 A1 | 4/2003 | Syeda-Mahmood | |
| 2003/0200192 A1 | 10/2003 | Bell et al. | |
| 2004/0249713 A1* | 12/2004 | Gross | 705/14 |
| 2005/0091120 A1 | 4/2005 | Auletta | |
| 2005/0125309 A1 | 6/2005 | Song | |
| 2005/0261989 A1* | 11/2005 | Vadon et al. | 705/27 |
| 2006/0224624 A1* | 10/2006 | Korn et al. | 707/104.1 |
| 2006/0259462 A1 | 11/2006 | Timmons | |
| 2006/0294086 A1 | 12/2006 | Rose et al. | |
| 2007/0094247 A1 | 4/2007 | Chowdhury et al. | |
| 2007/0214460 A1 | 9/2007 | Tsai et al. | |
| 2007/0233736 A1 | 10/2007 | Xiong et al. | |
| 2008/0033938 A1 | 2/2008 | Okamoto | |

(Continued)

OTHER PUBLICATIONS

Tip of the Week: Set Up Web Price Alerts Shelly Banjo. Wall Street Journal. (Eastern edition). New York, N.Y.: Dec. 2, 2007. p. 1.*

(Continued)

*Primary Examiner* — William Allen
(74) *Attorney, Agent, or Firm* — Shwegman Lundberg & Woessner, P.A.

(57) ABSTRACT

Apparatus, systems, and methods may operate to monitor an activity level associated with queries made in an online marketplace over a monitoring time period to provide an activity rate, and to determine that the activity rate has crossed a merchandising threshold rate. In response, a cluster of items or item groups associated with the queries may be presented on a display, perhaps in conjunction with a landing page merchandising promotion. Additional apparatus, system, and methods are disclosed.

18 Claims, 8 Drawing Sheets

U.S. PATENT DOCUMENTS

| | | | |
|---|---|---|---|
| 2008/0228689 | A1 | 9/2008 | Tewary et al. |
| 2009/0030803 | A1 | 1/2009 | Mohan |
| 2009/0259620 | A1* | 10/2009 | Ahene et al. .................. 707/3 |
| 2009/0299873 | A1* | 12/2009 | Seki et al. .................. 705/26 |
| 2010/0293474 | A1* | 11/2010 | York et al. .................. 715/751 |
| 2011/0231279 | A1 | 9/2011 | Mohan |

OTHER PUBLICATIONS

"U.S. Appl. No. 11/828,086, Non-Final Office Action mailed Sep. 16, 2010", 14 pgs.

"U.S. Appl. No. 11/828,086, Notice of Allowance mailed Mar. 4, 2011", 8 pgs.

"U.S. Appl. No. 11/828,086, Response filed Dec. 16, 2010 to Non Final Office Action mailed Sep. 16, 2010", 9 pgs.

"U.S. Appl. No. 11/828,086, Response filed Aug. 20, 2010 to Restriction Requirement mailed Aug. 18, 2010", 7 pgs.

"U.S. Appl. No. 11/828,086, Restriction Requirement mailed Aug. 18, 2010", 7 pgs.

"U.S. Appl. No. 12/082,565, Non-Final Office Action mailed Sep. 17, 2010", 19 pgs.

"U.S. Appl. No. 12/082,565, Final Office Action Mailed Jan. 31, 2011", 13 pgs.

"U.S. Appl. No. 12/082,565, Response filed Dec. 17, 2010 to Non Final Office Action mailed Sep. 17, 2010", 18 pgs.

"U.S. Appl. No. 12/082,565. Response filed Apr. 4, 2011 to Final Office Action mailed Jan. 31, 2011", 11 pgs.

"Collective Discovery Network", http://www.aggregateknowledge.com/services/network.html, Aggregate Knowledge, Inc., (Copyright 2006-2007).

"Discovery for Media", http://www.aggregateknowledge.com/services/media.html, Aggregate Knowledge, Inc., (Copyright 2006-2007).

"Discovery for Retail", http://www.aggregateknowledge.com/services/retail.html, Aggregate Knowledge, Inc., (Copyright 2006-2007).

"RSS—Wikipedia, the free encyclopedia", http://en.wikipedia.org/wiki/RSS, (Apr. 9, 2008).

"Topical—Definition from the Merriam-Webster Online Dictionary", http://www.merriam-webster.com/dictionary/topical, (Downloaded Apr. 9, 2008).

"Yahoo! Buzz Index", http://buzzlog.buzz.yahoo.com/rss_info/, (2008).

Bomhardt, Christian, "NewsRec, a SVM-driven Personal Recommendation System for News Websites", *Proceedings of the 2004 IEEE/WIC/ACM International Conference on Web Intelligence*, (2004), 545-548.

Jia, Jack, "The Long Tail of E-Commerce", *E-Commerce Times*, http://www.ecommercetimes.com/story/57766.html, (Jun. 11, 2007).

Porter, Joshua, "Watch and Learn: How Recommendation Systems are Redefining the Web", http://www.uie.com/articles/recommendation_systems, (Dec. 13, 2006).

"U.S. Appl. No. 13/118,847, Notice of Allowance mailed Oct. 18, 2011", 20 pgs.

\* cited by examiner

PRESENTING ITEMS BASED ON ACTIVITY RATES

BACKGROUND

The ubiquitous presence of networked computers, and the growing use of databases, web logs, and email has resulted in the accumulation of vast quantities of information. Many individual computer users now have access to this information via search engines and a bewildering array of web sites. Some of these sites provide the opportunity to purchase items via an online marketplace, which may comprise an online auction environment, an online retail or wholesale purchase environment, or any other online environment where goods and/or services are made available for purchase.

BRIEF DESCRIPTION OF THE DRAWINGS

The present disclosure is illustrated by way of example and not limitation in the figures of the accompanying drawings, in which.

DETAILED DESCRIPTION

Introduction

Figure 1:
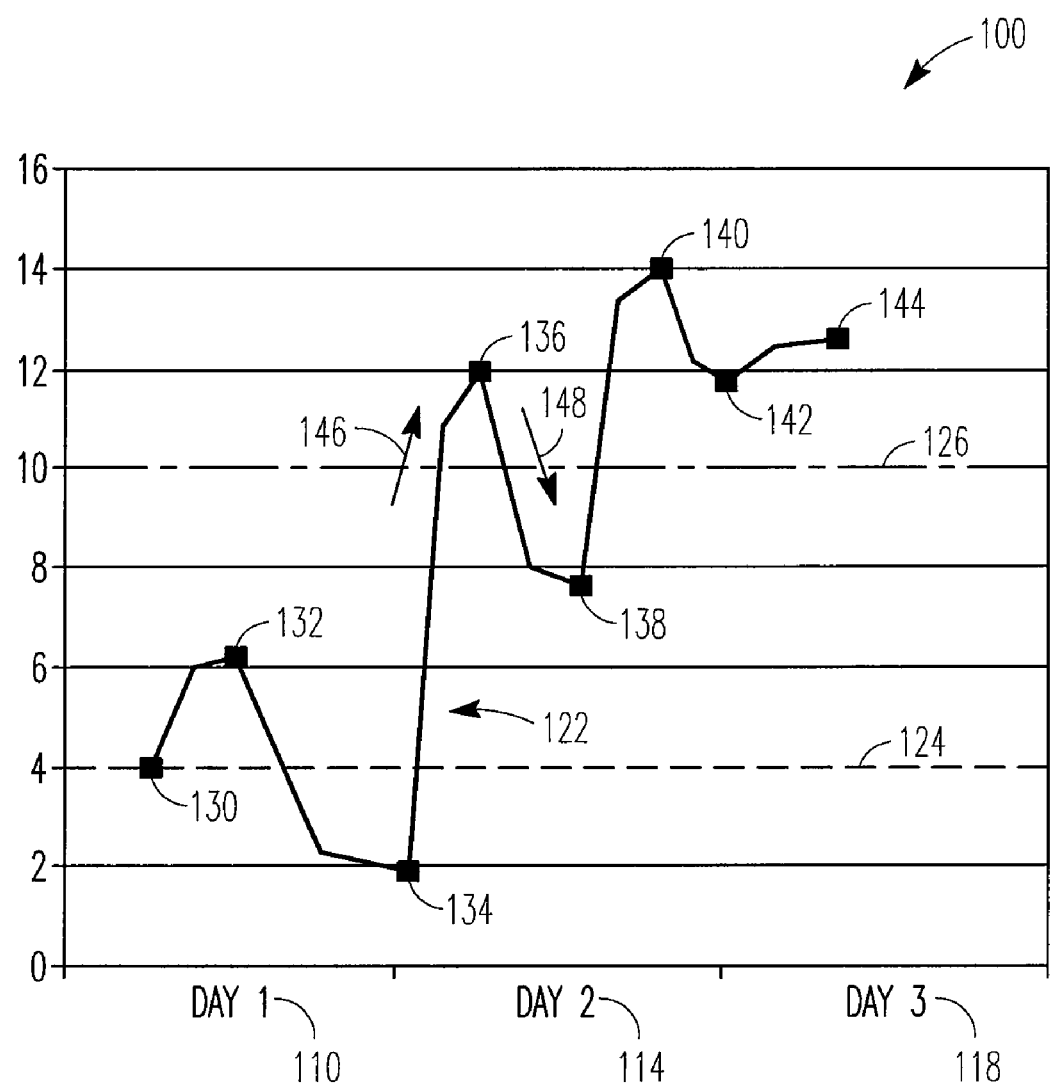
FIG. 1 is a graph illustrating activity levels associated with queries made in an online marketplace according to various embodiments of the invention.

During the lifetime of an online marketplace, a number of items are offered for sale. The interest in various items waxes and wanes over time, so that it is not always apparent which items are popular at which times. That is, a seller may offer items for sale, but often has no way of knowing whether the items offered are popular at the time the offer to sell is made. When there is no substantial buying history associated with the items offered for sale, the problem of determining popularity becomes even more difficult.

Some of the embodiments disclosed herein seek to address the challenge of detecting a level of interest, as well as other problems encountered when processing data associated with the conduct of an online marketplace, by introducing the concept of interest level monitoring and forecasting. Thus, rather than intuitively sensing whether interest in a particular item is trending upward or downward, objective criteria can be applied in a proactive fashion to determine the actual level of interest, and thus, the popularity of various items.

For example, in some embodiments, the frequency and content of online queries can be monitored. The term "query" as used herein may comprise one or more search terms, a bid on a particular item or product, completion of a Buy It Now (BIN) sale, a question issued to the seller of an item, viewing an item, watching an item, demographics related to a buyer viewing or making a bid on an item, or any other action directly initiated by one or more buyers in an online marketplace. A query may also comprise an indirect action initiated as a result of buyer activity. An example of such indirect action might be a seller acting to place five additional identical items on sale in response to learning that the first item of the same type has been sold.

Queries may serve to indicate interest in a catalogue of products, individual products, groups of items, or even individual items. In a simple implementation, one might monitor the level of queries dealing with an individual item ten times a day. Increased interest would be indicated if, for example, it was determined that the number of queries in the first four hours of a given day was significantly higher than the average for the past two weeks.

Average levels of interest can be determined empirically. Query terms and associated activity for a selected marketplace can be recorded constantly, periodically, or aperiodically. Statistics regarding the queries can be developed, such as: how often they've been issued, how many items people look at as a result of those queries, how many bids people make, and how many purchases (including immediate, or BIN purchases) are made as a result.

To reduce the amount of information recorded, an "initial interest" threshold level, such as a daily average level, may be chosen, such that information associated with queries, or the content of the queries themselves, are not retained unless the number of queries rises above that level (e.g., ten per day, or 100 per day). Once the number of queries over time reaches or exceeds this first threshold, more detailed data may be recorded. When the number of queries passes a second, higher threshold—"merchandising threshold rate"—one might conclude that an appropriate level of interest is now present, and additional action should be taken. For example, a flag or other indication of heightened interest may be set, and in response, a cluster of items associated with the queries may be created, perhaps for presentation to individuals making subsequent, related queries.

For example, assume that several queries are received that include the name of a famous personality in conjunction with one or more clothing items. If sufficient interest is indicated (e.g., by receiving a specified number of subsequent queries over time that include the name of the personality), subsequent queries that include the personality name, even those that do not mention clothing items, may result in the presentation of a cluster of clothing items that have been previously associated with the personality.

To determine whether sufficient interest exists in a topic then, some merchandising threshold rate should be detected or observed. This implies receiving a selected number of queries over a specified time period. The time period or window should be large enough to detect a change among the number of marketplace queries, and small enough to permit taking timely action based on spikes or temporary changes in popularity. In other words, once the change in popularity is detected, there should be sufficient time remaining to take advantage of the item's popularity.

Determining that the reverse situation exists may also be useful. That is, when interest in an item begins to wane, as detected by the number of queries over time falling below the merchandising threshold, or some other threshold (e.g., a reduced interest threshold), the presentation of special offers or other merchandising operations associated with elevated interest levels may be halted. Alternative merchandising efforts may also be launched, such as special promotional or clearance sales, to bolster waning interest. If the number of queries over time falls still further, perhaps below an average level, or the initial interest threshold, or some other threshold level, then the process may return to searching for elevated interest in the future.

For example, assume that an average number of queries for a particular item is determined to be 500 per day. Some embodiments might operate to record queries for any item that has more than an initial interest threshold rate averaging at least 100 queries per day (e.g., the first or initial interest rate threshold), and so queries for this item having an average of 500 queries per day would automatically be recorded.

Further assume that once the rate of queries reaches 1000 per day (the second, or merchandising threshold rate), merchandising offers based on the content of the queries and associated items will be presented. This demonstrates the use of a threshold rate based on actual activity. Initial interest rate and merchandising thresholds may be fixed values (e.g., 100 views per day), or proportional to other activity (e.g., when item views exceed the daily average by 25%). Thresholds may differ based on price points (e.g., lower-priced items may have a higher threshold for detecting interest, and higher-priced items may have a lower threshold). Group or global thresholds with respect to products, groups of items, categories, and even an entire web site may also be set.

In some cases, merchandising may be initiated based on an increasing level of activity that leads to the expectation, or forecast, of sufficient activity in the future that will surpass the merchandising threshold. Thus, in the immediately preceding example, if 500 queries are received within a four hour time period, rather than over one day, a forecast of 6=500=3000 queries might be made for one day, which clearly exceeds the 1000 query per day merchandising threshold rate. In that case, merchandising might begin after the fourth hour, based on the rate of increase in interest, or a forecast level of interest, rather than the actual level of interest.

Another possibility for forecasting involves noting the patterns of activity throughout the day over the entire marketplace. For example, if marketplace activity general peaks between 10 am and noon, such that 25% of the daily query volume occurs in this two hour period, and queries for a particular item approach 50% of the average daily number for that item during this same time period, the forecast might be that the total number of queries received for that item by the end of that day will be double the average expected number. If this amount surpasses the merchandising threshold rate for that item, then clustered presentations of items responsive to queries that occur after that time period during that day may be made. Many other possibilities for forecasting future query activity can be implemented, including the described methods of tracking individual item query-related data, or tracking overall marketplace queries (or queries related to sub-groups of items in the marketplace) and relating that activity to individual item query activity.

Forecast and measured elements may even be combined. For example, a merchandising system may operate to allocate merchandising opportunities based on a measured level of increased interest for a selected group (e.g., based on detected demographics), coupled with some level of expected (forecast) revenue increase.

Merchandising engines or modules may operate to merchandise items in order of priority associated with their popularity score. For example, if queries associated with a first brand of item increase by 20%, and the queries associated with a second brand of item increase by 40%, then twice as much time might be allotted to presenting merchandising promotions for the second brand as to the first. Thus, when an item is flagged for achieving sufficient interest to merit merchandising, the category of product type can be recorded, as well as demographics of those making the query, and other data. This data may be used to further target merchandising efforts.

For example, it may be noted that queries are made by a certain age group, or come from a certain area of the country, and that the persons making those queries are typically interested in sporting goods. This information can be used to focus merchandising promotions on clusters of items that fall into the sporting goods category.

As a further example, even queries related to items that do not fall into a standard category, such as birds' nests, can be tracked. Assume there are several sellers of birds' nests, and each nest is slightly different. In this case, there is no manufacturing product identification number; each item is unique. Even so, attributes might be associated with the items, so that one is listed as having a brown colour, and another as being black. One weighs less than 100 grams, while another weighs over a kilogram, etc.

Assume that the number of queries for birds' nests increases, and most of those making the queries are viewing seagull nests. Once the merchandising threshold is passed, or is forecast to be passed, then merchandising of birds' nests, and seagulls birds' nests may be initiated. Or if 50% of the queries are for seagull nests, and 25% of the queries are for eagle nests, then presentations may be weighted in favour of seagull nests, and then eagle nests. And even though a standard "bird's nest" category may not initially exist, one can be created based on the flagged interest level, and further subdivisions may be made based on attributes applied by sellers, as well as other discriminating descriptive information.

A specific landing page may be constructed for display in response to queries made after the merchandising threshold level of interest has been reached. Thus, if the queries in relation to a sports celebrity have passed the merchandising threshold, instead of a generic web page that gives the results of the query, a landing page might be displayed to present additional or specially-tailored information. For example, news stories, links, and/or statistics regarding the sport celebrity's career may be shown.

In addition, relationships between items and item groups with increased popularity, and buyer demographics can be developed. Then related items and item groups may be advertised on any available page where appropriate viewer demographics are later detected (e.g., on the same site where activity on the web pages is monitored to detect increased interest, or even on another site having unrelated pages, such as where the monitored web site might place advertising). Demographics may comprise personal attributes (e.g., age, location) and/or behavioral attributes (e.g., previous purchase interest, current interest). Increasing popularity may thus be used to initiate the capture of demographic information for individuals, groups, and communities, as well as to present advertising to audiences having demographics that are related to those which have already been collected.

News sites on the Internet may be mined to secure additional information related to queries that reach sufficient levels of interest. Categories or items associated with some selected percentage or number of past queries can be highlighted on the landing page, perhaps encouraging those making future queries to investigate those particular categories or items. This may have the result of helping to provide a more complete query result for those queries that were originally directed to a more general topic.

Example Operations

FIG. 1 is a graph 100 illustrating activity levels associated with queries made in an online marketplace according to various embodiments of the invention. As shown, this is only one possible way, out of many, in which activity level information can be organized. The activity level 122 displayed may represent a number of queries made during an online auction, a number of queries made to an online store, email queries, etc. The vertical scale may represent an actual number of queries, a relative number of queries, or the cumulative/piecewise rate at which queries have been made. The horizontal scale represents time.

Here the activity level 122 associated with a number of queries per hour made over three days 110, 114, 118 can be observed. As the activity level 122 changes over time, beginning at point 130, it can be seen that the initial interest threshold 124 (e.g., four queries per hour) has been reached, and is passed at the second point 132. However, the number of queries drops below the initial interest threshold 124 at the end of the first day 110, at point 134.

After the beginning of the second day 114, it can be seen that the activity level 122 shows the number of queries has passed both the initial interest threshold 124, as well as the merchandising threshold 126 (e.g., ten queries per hour). Later on in the second day 114, the activity level 122 has fallen below the merchandising threshold 126 at point 138, but rises above it again near the end of the second day 114, at point 140. Thereafter, the activity level on the third day 118 remains above the merchandising threshold level 126 as determined at points 142, 144, and in some embodiments, a forecast may be made at point 144 to the effect that the activity level 122 will remain elevated above the merchandising threshold 126 for the remainder of the third day 118.

Depending on the various parameters selected, clusters of items or item groups associated with the queries may be presented in response to receiving related queries after detecting the elevated activity level 122 noted at points 136, 140, 142, and/or 144. For example, in some embodiments, the level of interest shown at point 136 may be considered too brief to engage in merchandising presentations. Only after the activity level 122 shown at points 140 and continuing on to point 142 are detected might special merchandising presentations be engaged.

Categories of items, such as "Toys" are only one of many types of classification mechanisms that can be used to classify queries, or to associate with queries that are made for the purpose of clustering items for merchandising presentation. For example, item attributes (e.g., size, color, weight, price, seller rating, etc.), and the user's previous history of color choices, can also be used. Thus, a user making a query within the category of "Clothes" with a known preference for the size "Large" after a high level of interest has been detected with respect to "Red" clothing might be shown a landing page of large, red shoes, dresses, and blouses before other items. The landing page presentation may thus be weighted to favor the history of a particular buyer, or demographics associated with the buyer.

Tags are keywords that can be associated with a given object, typically an item, as another kind of classification (e.g., expensive toys, 60's rock and roll, etc.). While attributes are generally fixed (e.g., size of a ring, color of a sweater, length of a pool table), tags are more flexible. This is because tags may be assigned by a computer system, in an automated fashion (e.g., by analyzing keywords in an item description, appropriate tags may be selected), or by users. Thus, in some embodiments, tags can also be used as part of query tracking, as well as associated with the cluster of items for display.

Users (e.g., buyers, sellers, bidders, employees, neighborhood members, etc.) can even attach tags to themselves. Such self-assigned tags may include hobbies; favorite books, movies, and shows; gender; age; friends; trading partners. Users may also be associated with system-assigned tags, or tags arising out of profile information (e.g., geographic locations; feedback; items purchased; items sold; saved items; watched items; searches; price range of purchases; time and/or date of purchases; etc.).

Controls may be presented to a user to further focus or limit the presentation. For example, a visual slider control (e.g., see slider 350 in FIG. 3) might be used to select sizes, colors, price ranges, etc. In more complex embodiments, sliders may be used to weight presentations, so that, for example, sellers with a high trust rating are displayed ahead of sellers with a low trust rating. Items that have many purchases from a particular seller might be displayed before those sold by persons with less experience. In some embodiments, the control (which may be something other than a slider, such as a knob or switch widget) can be used to broaden or narrow the number of items seen on any particular level. Many other variations are possible.

Figure 2:
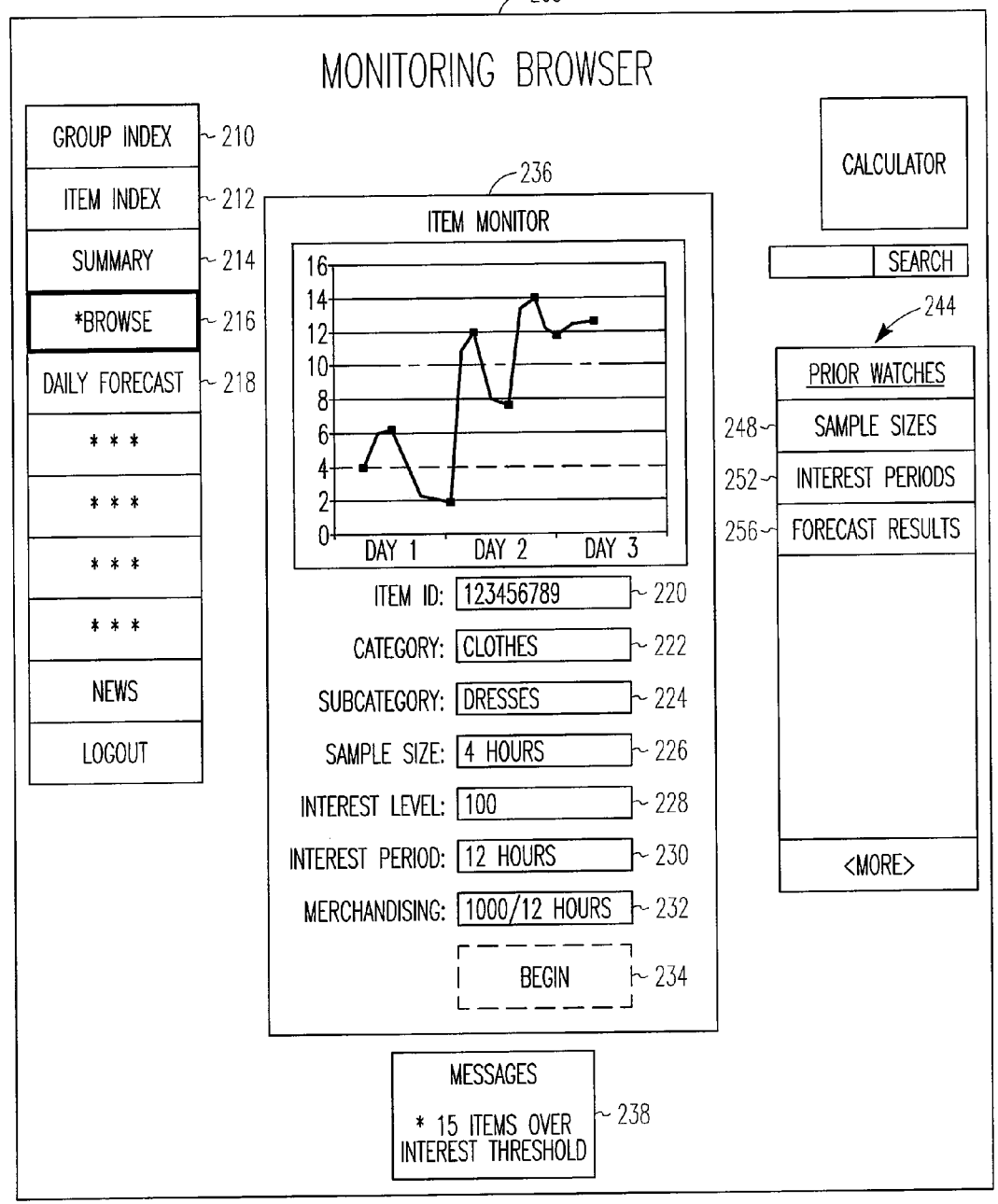
FIG. 2 is a simplified diagram of a graphical user interface that can be used to implement item interest level monitoring according to various embodiments of the invention.

FIG. 2 is a simplified diagram of a graphical user interface (GUI) 200 that can be used to implement item interest level monitoring according to various embodiments of the invention. The interface 200 is one of many that are possible. In the particular example of FIG. 2, a sample web page 208 that might be seen by an individual user logged into a terminal that enables selection of monitoring parameters for items and groups of items, is shown.

Here, the "BROWSE" menu option 216 has been selected, calling up the MONITORING BROWSER page 208. This selection permits the user to view information about monitored items, and to enter parameters affecting item level of interest monitoring. Other menu options might include choosing to view an index of groups 210 that can be monitored, an index of items 212 that can be monitored, a summary 214 of monitoring that is already in progress, or items that have a forecast level of interest 218 due to exceed the merchandising threshold rate before the end of the day. In another area 244 of the GUI 200, the user may be permitted to view previous monitoring efforts, perhaps researching sampling window time period sizes 248, previous periods of increased interest 252, or how well current levels of interest correlate with prior forecasts 256.

In the individual item monitor area 236, an item or query identification number 220 may be assigned to monitor levels of interest in a particular category 222 (e.g., clothing) and subcategory 224 (e.g., dresses). A sample size time period 226, denoting an interval at which the number of queries will be periodically recorded, may be specified. The initial interest threshold rate for recording query activity can be specified using an interest threshold 228 and a time period 230 (e.g., 100 queries over the interest time period of twelve hours). Once the parameters have been selected, monitoring can be initiated using the BEGIN widget 234. The merchandising threshold rate 232 (e.g., shown here as 1000 queries within twelve hours) can be specified as well. In some embodiments, a message field 238 in the GUI 200 may be used to inform the user of items associated with query quantities that have exceeded the merchandising threshold rate that day, etc.

In order not to overwhelm the reader with examples, many other possibilities have not been shown. However, it should be understood that many different classes of information can be used to determine the types of queries that are to be monitored when determining a level of interest. For example, demographic information can be monitored. Keywords can be monitored. Indeed, any of the information specified as part of a query can be selected for monitoring. Users can also specify as part of a monitoring request, or intervene after monitoring begins to override prior monitoring requests, to note, for example, that the interest level associated with certain keywords should always (or never) be monitored.

Figure 3:
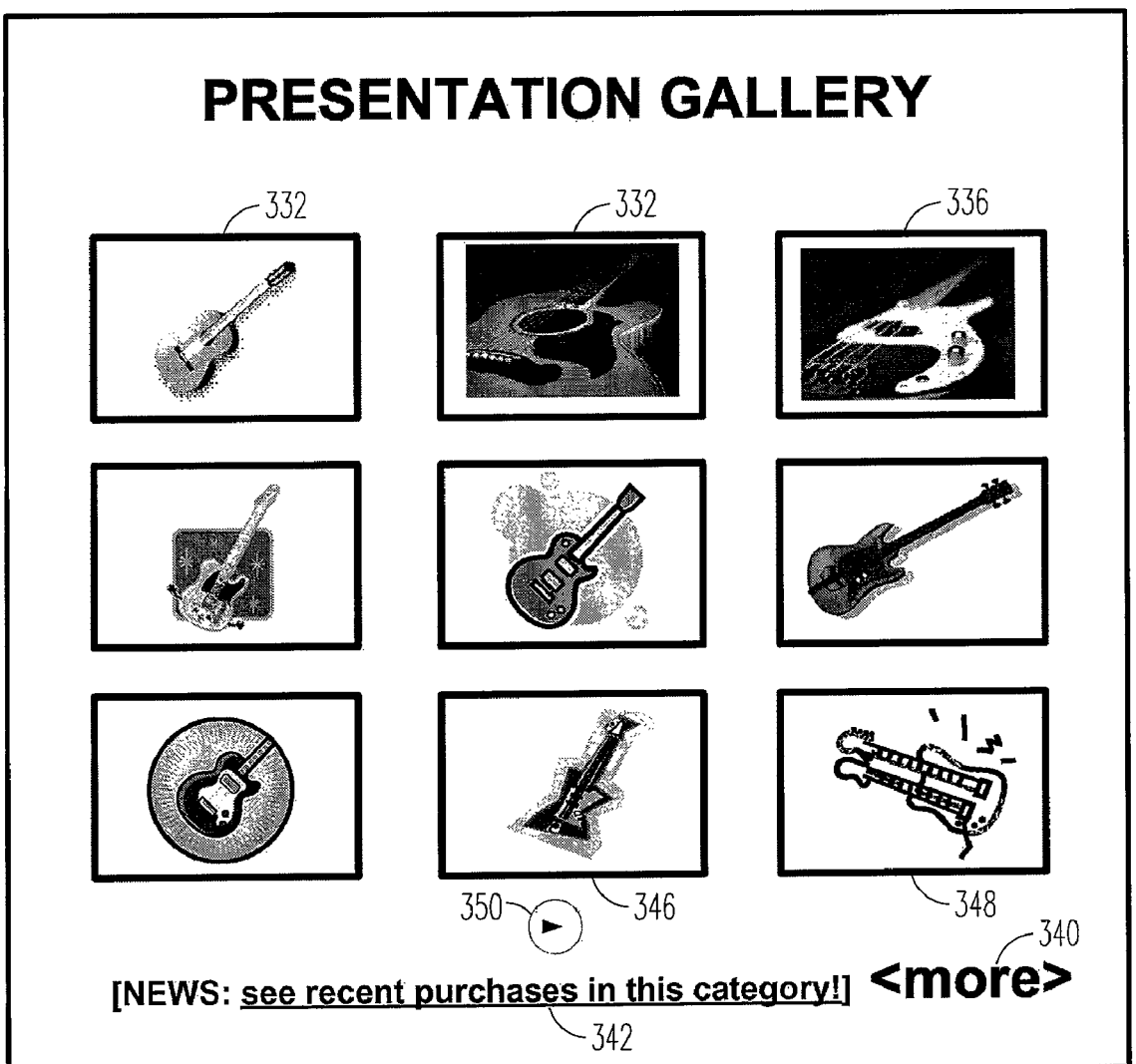
FIG. 3 is a diagram illustrating a landing page presentation gallery according to various embodiments of the invention.

FIG. 3 is a diagram illustrating a landing page presentation gallery 328 according to various embodiments of the invention. The GUI 300 shown is just one of many that are possible. In the particular example of FIG. 3, a sample of what might be seen by a user in response to entering a query related to an item (e.g., guitars) where the level of interest has exceeded the merchandising threshold rate is shown.

For example, in this particular display, a number of guitars are illustrated. The display may be in graphic form as shown, with the images of acoustic guitars 332 given priority over electric guitars 336, 346, 348. Moreover, single-neck guitars 332, 336, 346 may be given priority over double-neck guitars 348. The ordering may be based on the frequency of such designations in buyer queries, seller listing titles, or any number of data available to the system implementing the methods described herein.

In some embodiments, the gallery 328 may be continued on another page, perhaps by selecting (e.g., clicking on) the <more> widget 340. News items relating to the items displayed, or a link to further information (e.g., recent sales on similar items) may be viewed by selecting the link 342. The visual slider control 350 may be used to narrow or broaden the number of items displayed. Many other variations are possible, as noted above.

Example Apparatus and Systems

Figure 4:
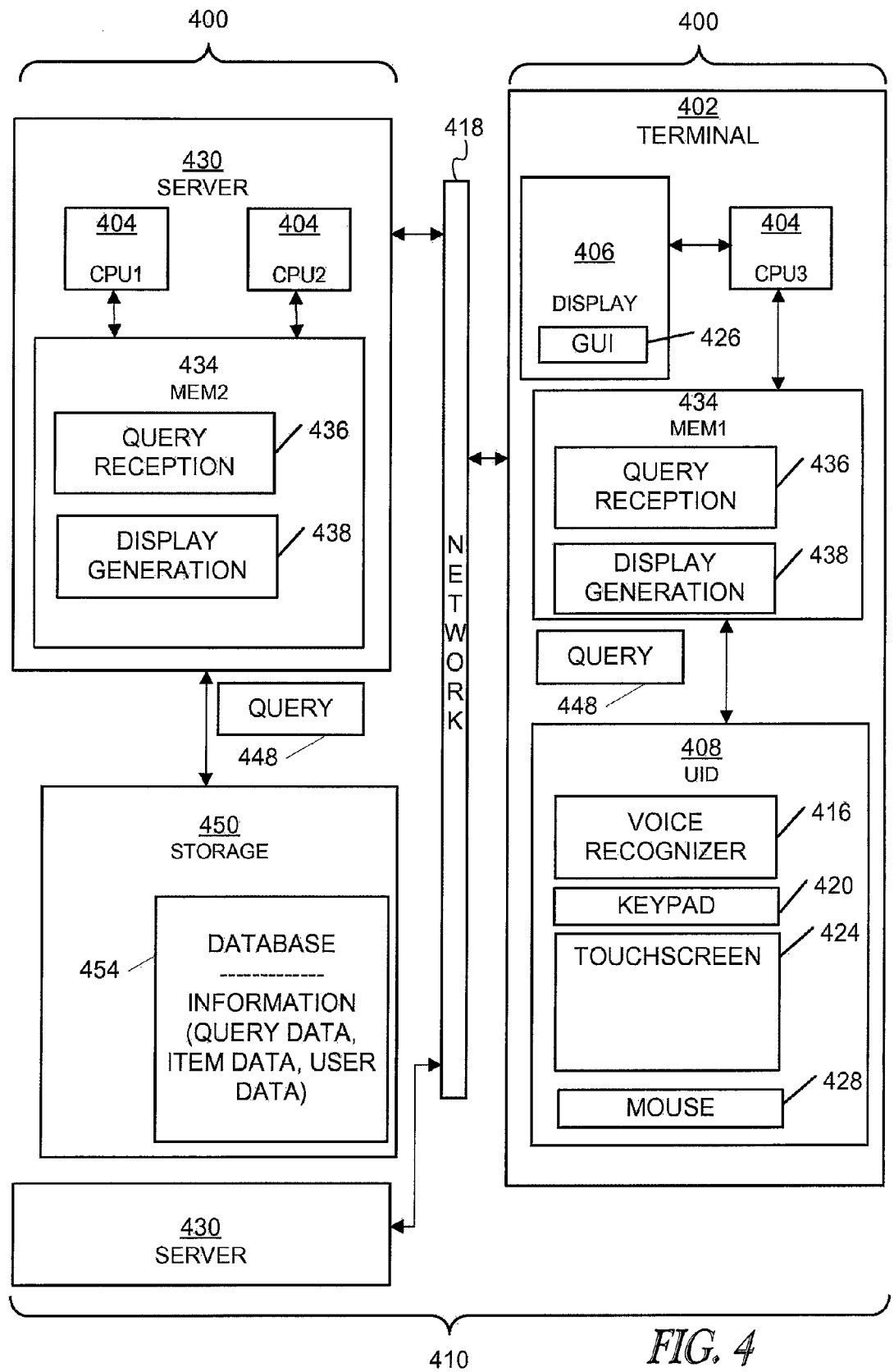
FIG. 4 is a block diagram of apparatus and systems according to various embodiments of the invention.

FIG. 4 is a block diagram of apparatus 400 and systems 410 according to various embodiments of the invention. The apparatus 400 may comprise many devices, such as a terminal 402, a server 430, a generic computer, or other devices with computational capability.

The apparatus 400 may include one or more processors 404 coupled to a memory 434. Queries 448, such as those made by a user with respect to various items forming part of an online marketplace, may be received by the apparatus 400 and stored in the memory 434, and/or processed by a combination of the processor 404 and the query reception module 436. Thus, many embodiments may be realized.

For example, an apparatus 400 to process changes in item or product popularity may comprise a query reception module 436 to receive queries 448 associated with gathering information regarding items for sale or to be sold in an online marketplace. The query reception module 436 may comprise a full application, a thin client, or other software and/or firmware to receive and process queries made within the context of an online marketplace The apparatus 400 may include one or more processors 404 to monitor an activity level associated with the queries over a monitoring time period to provide an activity rate (AR). The processor(s) 404 may also be used to determine that the AR has crossed a merchandising threshold rate (i.e., a merchandising threshold that specifies a number of queries made over a specific period of time, such as 100 queries per day, or 50 queries per hour).

The apparatus 400 may include a display generation module 438 to generate information related to displaying a cluster of items or item groups associated with the queries, responsive to the processor(s) 404 determining that the AR has crossed the merchandising threshold rate (MTR). One or more of the processors 404 and the query reception module 436 may be included in a single server 430. The apparatus 400 may include one or more memories 434 to store a data structure 454 (e.g., a database) that includes a variety of information, including terms from the queries associated with item titles, item descriptions, item categories, item attributes, and/or item tags. Information related to users, such as information taken from user profiles, may also be stored in the data structure 454.

The apparatus 400 may include one or more user input devices 408, perhaps used to generate the queries 448. The user input devices 408 may comprise one or more of a voice recognizer 416, a keyboard or keypad 420, a touch screen 424, or a mouse 428. The display 406 and/or the touch screen 424 may be used to display one or more GUIs 426, such as those shown in FIGS. 2 and 3. The GUI 426 may be used to arrange the presentation of a landing page in response to the determination that the monitored AR has exceeded (or is forecast to exceed) a selected MTR.

A system 410 to process changes in item or product popularity may include one or more of the apparatus 400, such as one or more terminals 402, and one or more servers 430. The terminals 402 may take the form of a desktop computer, a laptop computer, a cellular telephone, a point of sale (POS) terminal, and other devices that can be coupled to the servers 430 via a network 418. Terminals 402 may include one or more processors 404, and memory 434. The network 418 may comprise a wired network, a wireless network, a local area network (LAN), or a network of larger scope, such as a global computer network (e.g., the Internet). Thus, the terminal 402 may comprise a wireless terminal. Each of the servers 430 and terminals 402 may be used as a source of queries 448, as well as a station where item monitoring parameters may be entered, as shown in FIG. 2.

Therefore, many embodiments may be realized. For example, a system 410 may comprise a network of servers 430 and any one or more components of the terminal 402, such as a query reception module 436, one or more processors 404, and a display generation module 438 that operate as described previously. The system 410 may thus include a client terminal 402 that can be used to provide the queries 448 and to display items, item groups, and other information. The query reception module 436 may be divided between the client terminal 402 and the network of servers 430. The network 418 may comprise a global computer network, such as the Internet.

Storage in conjunction with server 430 operations may be accomplished using the memory 434, the storage unit 450, or both. One or more data structures 454, including databases, may be maintained by the server 430 to track presentation factors used to weight the display of various information according to the content of the queries 448 that have been received, and/or factors specified by users entering the queries.

Example Methods

Figure 5:
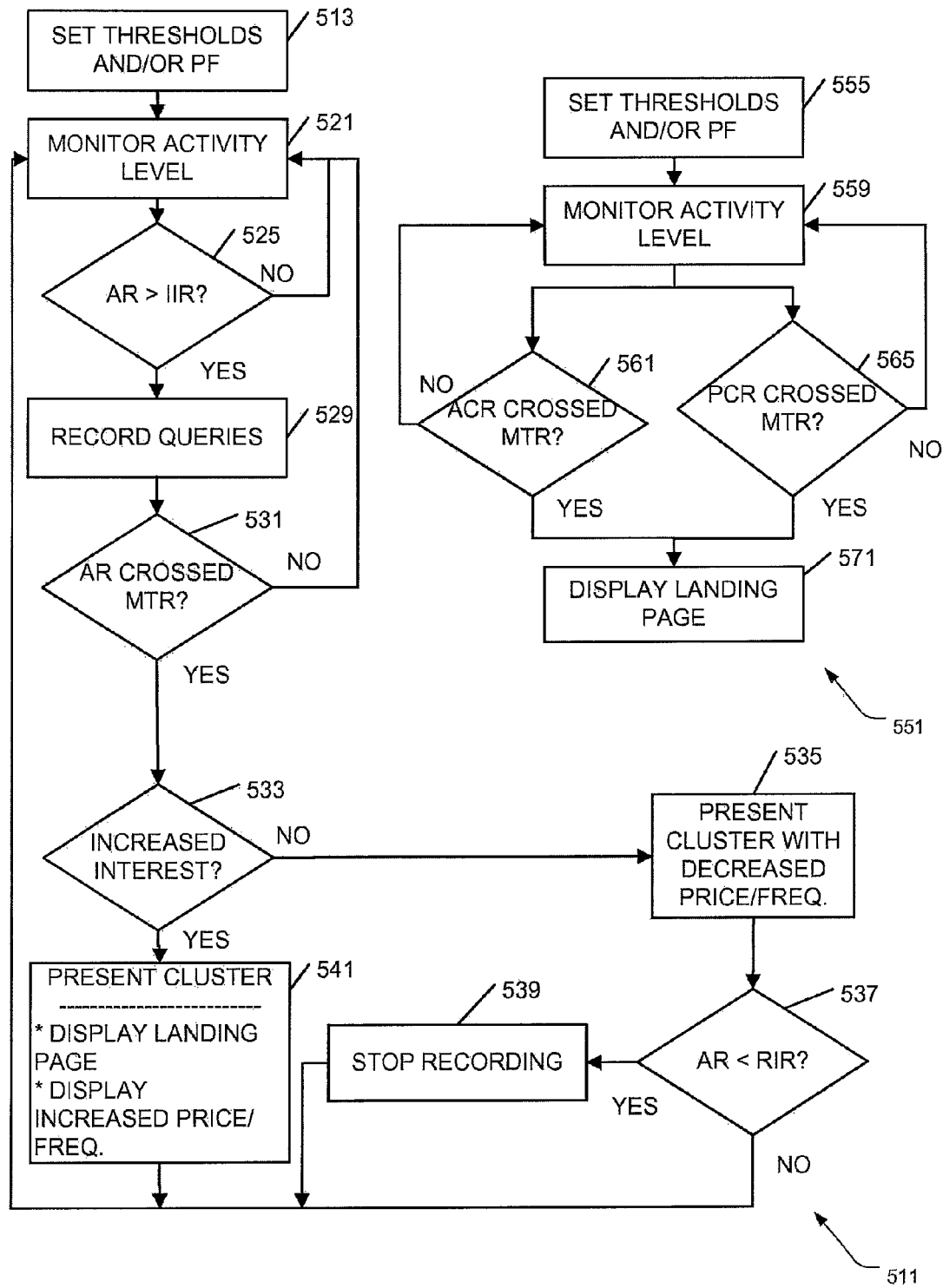
FIG. 5 is a flow diagram illustrating methods of processing changes in item popularity according to various embodiments of the invention.

FIG. 5 is a flow diagram illustrating methods 511, 551 of processing changes in item popularity according to various embodiments of the invention. For example, a computer-implemented method 511 to process changes in item or product popularity, as indicated by level of interest, may begin at block 513 with setting one or more thresholds and/or presentation factors (PFs).

For example, an MTR can be set to indicate what level of activity, or AR (e.g., queries per unit time), should prompt merchandising activity. An increased interest rate (IIR) threshold might be set, so that when the IIR threshold is crossed by the AR, information contained in queries (i.e., query information), or other information associated with queries (e.g., user identity, user profile information, item catalog information, item attributes, tags, etc.) can be recorded. A reduced interest rate (RIR) threshold may also be set to halt information recording activity when the AR falls below the RIR. Other thresholds, described above, may also be established at this time.

Presentation factors (PFs) may be used to adjust the order of item presentation according to the order of query terms, for example. PFs may also be used to determine how closely results of queries will be coupled to the level of interest. Therefore, the method 511 may include receiving a PF to weight the order of presentation of the items or item groups in clusters that are later presented to the user making a query. A visual slider control can be used to provide a PF in some embodiments.

The method 511 may continue on to block 521 with monitoring the activity level associated with queries made in an online marketplace over a monitoring time period to provide the AR. If it is determined that the AR has crossed the IIR, then the method 511 may include recording at least some of the queries associated with the AR when the activity rate is greater than IIR threshold. In this way, queries and other information can be recorded when the AR rises above some minimum desired level. The method 511 may include recording queries and other information continuously, or non-continuously, such as at periodic intervals for selected time periods. Queries may also be recorded aperiodically, or randomly.

The method 511 may include determining whether the AR has crossed the MTR at block 531. If not, the method 511 may continue with further monitoring activity at block 521. If so, then the method 511 may go on to block 533 with determining whether the AR has crossed the MTR in a first direction, indicating increased interest. If not, then the method 511 may include determining that the AR has crossed the MTR in a second direction, indicating decreased interest. In most cases, traversing the MTR in a positive direction indicates increased interest, while traversing the MTR in a negative direction indicates decreased interest (e.g., see arrows 146 and 148, respectively, shown in FIG. 1).

If decreased interest is indicated, the method 511 may continue to block 535 with presenting a cluster of items or item groups in conjunction with decreased prices or decreased presentation frequency. If it is determined that interest has waned to the point that the AR has fallen below the RIR threshold at block 537, the method 511 may include terminating recording of queries and/or other information at block 539.

If increased interest is indicated at block 533, then the method 511 may include presenting a cluster of items or item groups associated with the queries on a display. The activity of blocks 535 and 541 can occur in response to the MTR being crossed by the AR, whether the AR has crossed the MTR in either a positive or negative direction. Thus, in some embodiments, the method 511 may include monitoring the AR, determining when sufficient interest occurs by detecting that the AR has crossed the MTR, and then presenting a cluster of items or item groups when sufficient interest arises. Items may comprise goods or services, and may be characterized as "products" when forming part of a "catalog", which is a collection of predefined products.

Presenting the cluster at block 541 may include displaying a landing page (including the cluster) on a display in response to detecting a new query associated with prior queries (that have been used to detect an increase in the level of interest). Thus, each time a new, related query is entered, a focused or specialized landing page may be displayed.

For example, the method 511 may include presenting the cluster of items or item groups in conjunction with increased prices or increased presentation frequency when increased interest is indicated at block 541. That is, increased interest may dictate the presentation of increased prices or increased presentation frequency, and vice-versa, as indicated by blocks 535 and 541.

The presentation of items at block 541 may include presenting the cluster of items or item groups derived from viewing activity associated with the queries. In this way, items can be selected for presentation based on what was actually viewed in conjunction with prior queries. For example, demographic activity may be used, as described above, to initiate the addition of a presentation module to other web pages, perhaps connected to the landing page, or disconnected entirely from the entity presenting the landing page. Thus, in response to detecting a new query associated with prior queries (e.g., detecting demographics associated with current queries being related to demographics associated with prior queries), the method 511 may include displaying a landing page including a cluster of items or item groups on a display, adding a merchandising module to another web site page, or both.

The landing page may include a visual slider mechanism having a plurality of positions to indicate a selected relevance level associated with the presentation of visible elements (e.g., see slider 350 shown in FIG. 3). This enables users to control the level of image relevance during their browsing experience. It should be noted that a slider may comprise a visual representation of a conventional sliding mechanism, such as a linear potentiometer, or any other type of control that allows selection of multiple choices, such as a visual representation of a knob, a multi-pole switch, a dial, etc. The slider can thus be used to control relevance during visual browsing (e.g., by selecting a PF), or simply to select one item from among several in a given level or group. Thus the method 511 may include presenting a visual slider mechanism to select individual ones of the items or item groups that are presented. Still other embodiments may be realized.

For example, some computer-implemented methods 551 of processing item or product popularity changes may begin at block 555 with setting thresholds and/or PFs, as described with respect to block 513 above. The method 551 may continue on to monitoring one or more activity levels associated with the queries to provide one or more corresponding ARs, as described with respect to block 521 above.

Monitoring, at either block 521 or 559, may comprise monitoring (in association with a query term included in queries that are entered) one or more of a number of queries, a number of items viewed, a number of item types viewed, a number of groups viewed, a number of group types viewed, a number of bids, a bid amount, a number of items watched, a type of item watched, a number of immediate purchases made (e.g., BIN purchases), an amount associated with immediate purchases made, a term included in a viewed item title, a term included in a viewed item description, associated demographics, an item tag, an item category, or an item attribute, among others.

The method 551 may continue with detecting an actual change in the AR, or determining a predicted change in the AR, and then go on to determining that the actual change or the predicted change has crossed the MTR at one of blocks 561, 565. If the MTR is not crossed, or no prediction is made that the MTR is expected to be crossed, then the method 551 may go on to include further monitoring activity at block 559. Determining that the actual change or the predicted change has crossed the MTR may include, for example, determining that the MTR was crossed in one of a first direction to indicate increased interest, or a second direction to indicate decreased interest.

Detecting that an actual change in the AR has occurred may include determining that the activity level measured over the monitoring time period has exceeded or fallen below an average activity level by a selected amount. That is, detecting the amount of actual change usually involves measuring the present change in activity level per unit of time.

Determining that a predicted change in the AR has occurred may include forecasting that the activity level measured during a first time period will exceed or fall below an average activity level by a selected amount within a second time period (subsequent to the first time period). That is, determining that a predicted change in the AR has occurred may using a currently-measured change in activity level per unit of time to forecast a predicted activity level in the future. Thus, the method 551 may also include forecasting a future AR based on the current AR and one or more of the time of day, the day of the week, a calendar period, and/or an overall site activity level.

Responsive to determining that the actual change or the predicted change has crossed the MTR, the method 551 may comprise displaying a landing page including items or item groups associated with the queries on a display and/or adding a merchandising module to another web site page in conjunction with a merchandising promotion at block 571. Thus, a landing page can be displayed in conjunction with a promotion when sufficient interest arises, either as measured or predicted. Alternatively, or in addition, a merchandising module can be added to a related web page, or some other web page that is unrelated to either the entity monitoring the queries, or the web site through which queries are monitored.

A merchandising promotion may comprise a number of activities or presentation tactics, including one or more of a sale, a hyperlink to a current news story, a hyperlink to an informational document, an auction created responsive to receiving one or more queries, a catalog of products, a collection of items, offers to previous buyers, or offers to previously interested potential buyers. The items and item groups presented may be associated with queries using one or more of demographics, item titles, item descriptions, item categories, item attributes, or item tags. That is, items, products, and groups of items/products can be matched to queries using titles, descriptions, categories, attributes and/or tags.

The methods 511, 551 described herein do not have to be executed in the order described, or in any particular order. Moreover, various activities described with respect to the methods identified herein can be executed in repetitive, serial, or parallel fashion. Information, including parameters, commands, operands, and other data, can be sent and received in the form of one or more carrier waves.

One of ordinary skill in the art will understand the manner in which a software program can be launched from a computer-readable medium in a computer-based system to execute the functions defined in the software program. Various programming languages may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using a number of mechanisms well known to those skilled in the art, such as application program interfaces or interprocess communication techniques, including remote procedure calls. The teachings of various embodiments are not limited to any particular programming language or environment.

Thus, the methods described herein may be performed by processing logic that comprises hardware (e.g., dedicated logic, programmable logic), firmware (e.g., microcode, etc.), software (e.g., algorithmic or relational programs run on a general purpose computer system or a dedicated machine), or any combination of the above. It should be noted that the processing logic may reside in any of the modules described herein.

Therefore, other embodiments may be realized, including a machine-readable medium (e.g., the memories 434 of FIG. 4) encoded with instructions for directing a machine to perform operations comprising any of the methods described herein. For example, some embodiments may include a machine-readable medium encoded with instructions for directing a server or client terminal or computer to perform a variety of operations. Such operations may include any of the activities presented in conjunction with the methods 511, 551 described above. Various embodiments may specifically include a machine-readable medium comprising instructions, which when executed by one or more processors, cause the one or more processors to perform any of the activities recited by such methods.

Marketplace Applications

Figure 6:
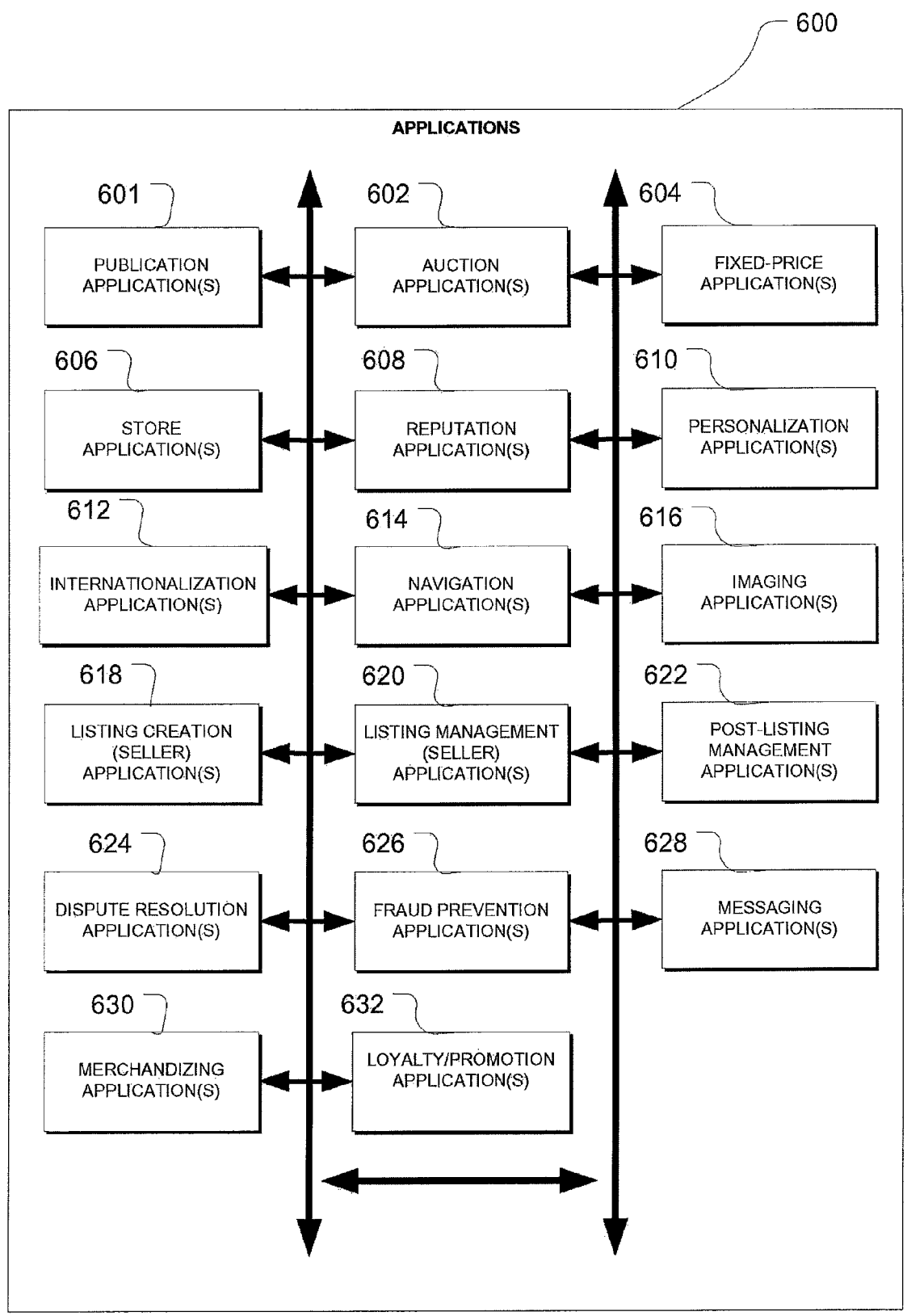
FIG. 6 is a block diagram illustrating applications that can be used in conjunction with processing changes in item popularity according to various embodiments of the invention.

FIG. 6 is a block diagram illustrating applications 600 that can be used in conjunction with processing changes in item popularity according to various embodiments of the invention. These applications 600 can be provided as part of a networked system, including the systems 410 and 700 of FIGS. 4 and 7, respectively. The applications 600 may be hosted on dedicated or shared server machines that are communicatively coupled to enable communications between server machines. Thus, for example, any one or more of the applications 600 may be stored in memories 434 of the system 410, and/or executed by the processors 404, as shown in FIG. 4.

The applications 600 themselves are communicatively coupled (e.g., via appropriate interfaces) to each other and to various data sources, so as to allow information to be passed between the applications 600, or so as to allow the applications 600 to share and access common data. The applications 600 may furthermore access one or more databases via database servers (e.g., database server 724 of FIG. 7). Any one or all of the applications 600 may serve as a source of queries, thresholds, presentation factors, and associated information for processing query data according to the methods described herein. The applications 600 may also serve as a source of determined user preferences and/or expressed user preferences.

In some embodiments, the applications 600 may provide a number of publishing, listing and price-setting mechanisms whereby a seller may list (or publish information concerning) goods or services for sale, a buyer can express interest in or indicate a desire to purchase such goods or services, and a price can be set for a transaction pertaining to the goods or services. To this end, the applications 600 may include a number of marketplace applications, such as at least one publication application 601 and one or more auction applications 602 which support auction-format listing and price setting mechanisms (e.g., English, Dutch, Vickrey, Chinese, Double, Reverse auctions etc.). The various auction applications 602 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 604 support fixed-price listing formats (e.g., the traditional classified advertisement-type listing or a catalogue listing) and buyout-type listings. Specifically, buyout-type listings (e.g., including the BIN technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 606 allow a seller to group listings within a "virtual" store, which may be branded and otherwise personalized by and for the seller. Such a virtual store may also offer promotions, incentives and features that are specific and personalized to a relevant seller.

Reputation applications 608 allow users that transact business, perhaps utilizing a networked system, to establish, build and maintain reputations, which may be made available and published to potential trading partners. When, for example, a networked system supports person-to-person trading, users may otherwise have no history or other reference information whereby the trustworthiness and credibility of potential trading partners may be assessed. The reputation applications 608 allow a user, through feedback provided by other transaction partners, to establish a reputation within a networked system over time. Other potential trading partners may then reference such reputations for the purposes of assessing credibility and trustworthiness.

Personalization applications 610 allow users of networked systems to personalize various aspects of their interactions with the networked system. For example a user may, utilizing an appropriate personalization application 610, create a personalized reference page at which information regarding transactions to which the user is (or has been) a party may be viewed. Further, a personalization application 610 may enable a user to personalize listings and other aspects of their interactions with the networked system and other parties.

Marketplaces may be customized for specific geographic regions. Thus, one version of the applications 600 may be customized for the United Kingdom, whereas another version of the applications 600 may be customized for the United States. Each of these versions may operate as an independent marketplace, or may be customized (or internationalized) presentations of a common underlying marketplace. The applications 600 may accordingly include a number of internationalization applications 612 that customize information (and/or the presentation of information) by a networked system according to predetermined criteria (e.g., geographic, demographic or marketplace criteria). For example, the internationalization applications 612 may be used to support the customization of information for a number of regional websites that are operated by a networked system and that are accessible via respective web servers.

Navigation of a networked system may be facilitated by one or more navigation applications 614. For example, a search application (as an example of a navigation application) may enable key word searches of listings published via a networked system publication application 601. A browse application may allow users to browse various category, catalogue, or inventory data structures according to which listings may be classified within a networked system. Various other navigation applications may be provided to supplement the search and browsing applications, including the interest level detection and processing applications described herein.

In order to make listings available on a networked system as visually informing and attractive as possible, marketplace applications may operate to include one or more imaging applications 616 which users may use to upload images for inclusion within listings. An imaging application 616 can also operate to incorporate images within viewed listings. The imaging applications 616 may also support one or more promotional features, such as image galleries that are presented to potential buyers. For example, sellers may pay an additional fee to have an image included within a gallery of images for promoted items.

Listing creation applications 618 allow sellers conveniently to author listings pertaining to goods or services that they wish to transact via a networked system, and listing management applications 620 allow sellers to manage such listings. Specifically, where a particular seller has authored and/or published a large number of listings, the management of such listings may present a challenge. The listing management applications 620 provide a number of features (e.g., auto-relisting, inventory level monitors, etc.) to assist the seller in managing such listings. One or more post-listing management applications 622 can assist sellers with activities that typically occur post-listing. For example, upon completion of an auction facilitated by one or more auction applications 602, a seller may wish to leave feedback regarding a particular buyer. To this end, a post-listing management application 622 may provide an interface to one or more reputation applications 608, so as to allow the seller conveniently to provide feedback regarding multiple buyers to the reputation applications 608.

Dispute resolution applications 624 provide mechanisms whereby disputes arising between transacting parties may be resolved. For example, the dispute resolution applications 624 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 626 implement fraud detection and prevention mechanisms to reduce the occurrence of fraud within a networked system.

Messaging applications 628 are responsible for the generation and delivery of messages to users of a networked system, such messages for example advising users regarding the status of listings on the networked system (e.g., providing "outbid" notices to bidders during an auction process or to provide promotional and merchandising information to users). Respective messaging applications 628 may utilize any number of message delivery networks and platforms to deliver messages to users. For example, messaging applications 628 may deliver electronic mail (e-mail), instant message (IM), Short Message Service (SMS), text, facsimile, or voice (e.g., Voice over IP (VoIP)) messages via wired (e.g., Ethernet, Plain Old Telephone Service (POTS)), or wireless (e.g., mobile, cellular, WiFi, WiMAX) networks.

Merchandising applications 630 support various merchandising functions that are made available to sellers to enable sellers to increase sales via a networked system. The merchandising applications 630 also operate the various merchandising features that may be invoked by sellers, and may monitor and track the success of merchandising strategies employed by sellers.

A networked system itself, or one or more users that transact business via the networked system, may operate loyalty programs that are supported by one or more loyalty/promotions applications 632. For example, a buyer may earn loyalty or promotions points for each transaction established and/or concluded with a particular seller, and be offered a reward for which accumulated loyalty points can be redeemed.

Figure 7:
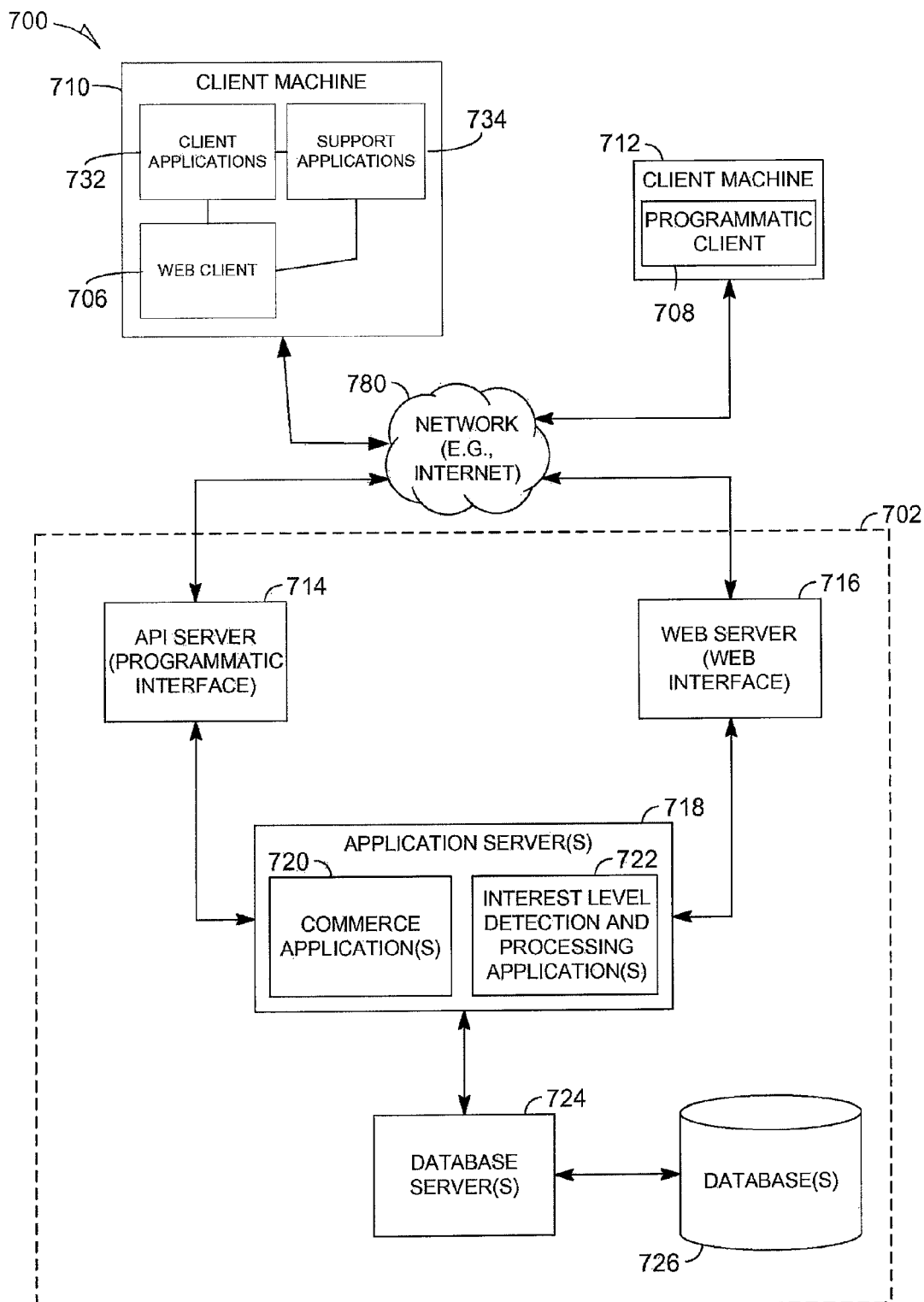
FIG. 7 is a block diagram illustrating a client-server architecture to process changes in item popularity according to various embodiments of the invention.

FIG. 7 is a block diagram illustrating a client-server architecture to process changes in item popularity according to various embodiments of the invention, including any of the methods described herein. A platform, such as a network-based information management system 702, provides server-side functionality via a network 780 (e.g., the Internet) to one or more clients. FIG. 7 illustrates, for example, a web client 706 (e.g., a browser, such as the Internet Explorer browser developed by Microsoft Corporation of Redmond, Wash.), and a programmatic client 708 executing on respective client machines 710 and 712. In some embodiments, either or both of the web client 706 and programmatic client 708 may include a mobile device.

Turning specifically to the system 702, an Application Program Interface (API) server 714 and a web server 716 are coupled to, and provide programmatic and web interfaces respectively to, one or more application servers 718. The application servers 718 host one or more commerce applications 720 (e.g., similar to or identical to the applications 600 of FIG. 6) and interest level detection and processing applications 722 (e.g., similar to or identical to the modules 436, 438 of FIG. 4). The application servers 718 are, in turn, shown to be coupled to one or more database servers 724 that facilitate access to one or more databases 726 (similar to or identical to the structure 454 of FIG. 4), such as registries that include links between individuals, their profiles, their behavior patterns, user-generated information, queries, thresholds, and activity level forecasts.

Further, while the system 700 employs a client-server architecture, the various embodiments are of course not limited to such an architecture, and could equally well be applied in a distributed, or peer-to-peer, architecture system. The various applications 720 and 722 may also be implemented as standalone software programs, which do not necessarily have networking capabilities.

The web client 706, it will be appreciated, may access the various applications 720 and 722 via the web interface supported by the web server 716. Similarly, the programmatic client 708 accesses the various services and functions provided by the applications 720 and 722 via the programmatic interface provided by the application programming interface (API) server 714. The programmatic client 708 may, for example, comprise a browser module to enable a user to submit selections of items, or queries, perhaps performing batch-mode communications between the programmatic client 708 and the network-based system 702. Client applications 732 and support applications 734 may perform similar or identical functions.

Example Machine Architecture

Figure 8:
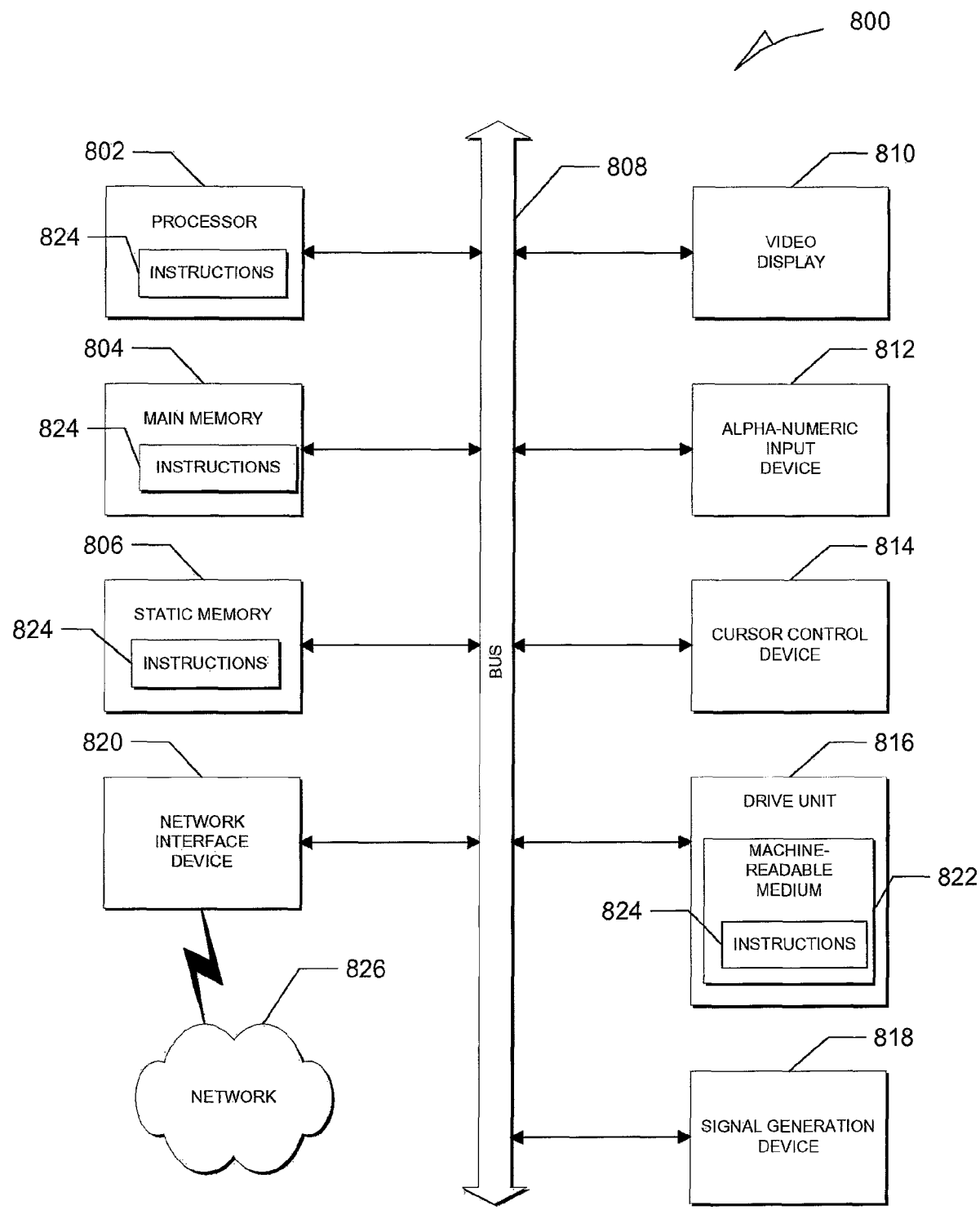
FIG. 8 is a block diagram of a machine in the example form of a computer system according to various embodiments of the invention.

FIG. 8 is a block diagram of a machine 800 in the example form of a computer system according to various embodiments of the invention. The computer system may include a set of instructions for causing the machine to perform any one or more of the methodologies discussed herein. The machine 800 may also be similar to or identical to the terminal 402 or server 430 of FIG. 4.

In some embodiments, the machine 800 may operate as a standalone device or may be connected (e.g., networked) to other machines. In a networked deployment, the machine 800 may operate in the capacity of a server or a client machine in a server-client network environment, or as a peer machine in a peer-to-peer (or distributed) network environment.

The machine 800 may comprise a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 may include a processor 802 (e.g., a central processing unit (CPU), a graphics processing unit (GPU) or both), a main memory 804 and a static memory 806, all of which communicate with each other via a bus 808. The computer system 800 may further include a video display unit 810 (e.g., liquid crystal displays (LCD) or cathode ray tube (CRT)). The display unit 810 may be used to display a GUI according to the embodiments described with respect to FIGS. 2 and 3. The computer system 800 also may include an alphanumeric input device 812 (e.g., a keyboard), a cursor control device 814 (e.g., a mouse), a disk drive unit 816, a signal generation device 818 (e.g., a speaker), and a network interface device 820.

The disk drive unit 816 may include a machine-readable medium 822 on which is stored one or more sets of instructions (e.g., software 824) embodying any one or more of the methodologies or functions described herein. The software 824 may also reside, completely or at least partially, within the main memory 804 and/or within the processor 802 during execution thereof by the computer system 800, the main memory 804 and the processor 802 also constituting machine-readable media. The software 824 may further be transmitted or received over a network 826 via the network interface device 820, which may comprise a wired and/or wireless interface device.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include tangible media that include, but are not limited to, solid-state memories, optical, and magnetic media.

Certain applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information).

In conclusion, it can be seen that various embodiments of the invention can operate to present a unique exploration experience to a user accessing large quantities of information. The embodiments disclosed can present clusters of items, perhaps in conjunction with specially-designed landing pages that contain information directly focused on the queries made by the user. This type of interface can be offered as an alternative to that available when more conventional keyword-based searching mechanisms are used. Increased user satisfaction may result.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer-implemented method, comprising:
    monitoring, using one or more processors, an activity level associated with queries made in an online marketplace over a monitoring time period to provide an activity rate;
    determining that the activity rate has crossed a merchandising threshold rate; and
    presenting a cluster of at least items or item groups associated with the queries on a display responsive to determining that the activity rate has crossed the merchandising threshold rate, the presenting comprising displaying the cluster of at least items or item groups in conjunction with at least one of increased prices or increased presentation frequency based on a determination that increased interest is indicated, the presenting comprising displaying the cluster of at least items or item groups in conjunction with at least one of decreased prices or decreased presentation frequency based on a determination that decreased interest is indicated, and the presenting comprising displaying a landing page including a plurality of images, each of the plurality of images corresponding to a different category of a common item associated with the cluster.

2. The method of claim 1, wherein presenting the cluster comprises:
    displaying a landing page including the cluster on the display.

3. The method of claim 1, wherein determining that the activity rate has crossed the merchandising threshold rate comprises:
    determining that the activity rate has crossed the merchandising threshold rate in a first direction, indicating the increased interest, or determining that the activity rate has crossed the merchandising threshold rate in a second direction, indicating the decreased interest.

4. The method of claim 1, comprising:
    recording at least some of the queries associated with the activity rate based on a determination that the activity rate is greater than an increased interest rate threshold.

5. The method of claim 4, comprising:
    terminating recording the queries based on a determination that when the activity rate falls below a reduced interest rate threshold.

6. An apparatus, comprising:
    a query reception module to receive queries associated with gathering information regarding items for sale or to be sold in an online marketplace;
    a processor to monitor an activity level associated with the queries over a monitoring time period to provide an activity rate, and to determine that the activity rate has crossed a merchandising threshold rate; and
    a display generation module to generate information related to displaying a cluster of at least items or item groups associated with the queries responsive to the processor determining that the activity rate has crossed the merchandising threshold rate, the display generation module configured to display the cluster of at least items or item groups in conjunction with at least one of increased prices or increased presentation frequency based on a determination that increased interest is indicated, the display generation module configured to display the cluster of at least items or item groups in conjunction with at least one of decreased prices or decreased presentation frequency based on a determination that decreased interest is indicated, and the display generation module configured to display a landing page including a plurality of images, each of the plurality of images corresponding to a different category of a common item associated with the cluster.

7. The apparatus of claim 6, wherein the processor and the query reception module are included in a single server.

8. The apparatus of claim 6, comprising:
    a memory to store a data structure including terms from the queries associated with at least one of item titles, item descriptions, item categories, item attributes, or item tags.

9. A system, comprising:
    a network of servers including a query reception module to receive queries associated with gathering information regarding items for sale or to be sold in an online marketplace, a processor to monitor an activity level associated with the queries over a monitoring time period to provide an activity rate, and to determine that the activity rate has crossed a merchandising threshold rate, and a display generation module to generate information related to displaying a cluster of at least items or item groups associated with the queries responsive to the processor determining that the activity rate has crossed the merchandising threshold rate, the display generation module configured to display the cluster of at least items or item groups in conjunction with at least one of increased prices or increased presentation frequency based on a determination that increased interest is indicated, and the display generation module configured to display the cluster of at least items or item groups in conjunction with at least one of decreased prices or decreased presentation frequency based on a determination that decreased interest is indicated, and the display generation module configured to display a landing page including a plurality of images, each of the plurality of images corresponding to a different category of a common item associated with the cluster; and a client terminal to provide the queries and to display at least the items or item groups.

10. The system of claim 9, wherein the query reception module is divided between the client terminal and the network of servers.

11. The system of claim 9, wherein the network comprises a global computer network.

12. A non-transitory machine-readable storage medium storing instructions, which when executed by one or more processors, cause the one or more processors to perform operations comprising:

monitoring an activity level associated with queries made in an online marketplace over a monitoring time period to provide an activity rate;

determining that the activity rate has crossed a merchandising threshold rate; and presenting a cluster of at least items or item groups associated with the queries on a display responsive to determining that the activity rate has crossed the merchandising threshold rate, the presenting comprising displaying the cluster of at least items or item groups in conjunction with at least one of increased prices or increased presentation frequency based on a determination that increased interest is indicated, the presenting comprising displaying the cluster of at least items or item groups in conjunction with at least one of decreased prices or decreased presentation frequency based on a determination that decreased interest is indicated, and the presenting comprising displaying a landing page including a plurality of images, each of the plurality of images corresponding to a different category of a common item associated with the cluster.

13. The non-transitory machine-readable storage medium of claim 12, wherein the instructions, when executed by one or more processors, cause the one or more processors to perform operations comprising:

receiving a presentation factor to weight an order of presentation of the items or item groups in the cluster.

14. The non-transitory machine-readable storage medium of claim 12, wherein the instructions, when executed by one or more processors, cause the one or more processors to perform operations comprising:

presenting a visual slider mechanism to select individual ones of the items or item groups.

15. The non-transitory machine-readable storage medium of claim 12, wherein the instructions, when executed by one or more processors, cause the one or more processors to perform operations comprising:

forecasting a future activity rate based on the activity rate and at least one of a time of day, a day in the week, a calendar period, or an overall site activity level.

16. The non-transitory machine-readable storage medium of claim 15, wherein the instructions, when executed by one or more processors, cause the one or more processors to perform operations comprising:

recording the queries non-continuously, at periodic intervals for selected time periods.

17. The non-transitory machine-readable storage medium of claim 16, wherein the instructions, when executed by one or more processors, cause the one or more processors to perform operations comprising:

presenting the cluster of the items or item groups derived from viewing activity associated with the queries.

18. The method of claim 1, wherein presenting the cluster comprises:

adding a merchandising module to another web site page in response to detecting a new query associated with the queries.

* * * * *

UNITED STATES PATENT AND TRADEMARK OFFICE
CERTIFICATE OF CORRECTION

PATENT NO. : 8,271,357 B2
APPLICATION NO. : 12/001283
DATED : September 18, 2012
INVENTOR(S) : Sunil Mohan It is certified that error appears in the above-identified patent and that said Letters Patent is hereby corrected as shown below:

On the Title Page, Item (56)

In column 2, under "U.S. Patent Documents", line 18, In the citation for U.S. PATENT "2008/0033938", after "Okamoto", insert --et al.--, therefore In column 2, under "Other Publications", line 1, before "Tip", insert --"--, therefore In column 2, under "Other Publications", line 1, after "Alerts", insert --"--, therefore In column 2, under "Other Publications", line 2, after "N.Y.", delete ":" and insert --,--, therefore On page 2, in column 1, under "Other Publications", line 17, after "12/082,565", delete "." and insert --,--, therefore On page 2, in column 2, under "Other Publications", line 28, after ""U.S. Appl. No. 13/118,847, Notice of Allowance mailed Oct. 18, 2011", 20 pgs.", insert --"U.S. Appl. No. 12/082,565, Final Office Action mailed Aug. 03, 2012", 12 pgs.
"U.S. Appl. No. 12/082,565, Non Final Office Action mailed Dec. 08, 2011", 14 pgs.
"U.S. Appl. No. 12/082,565, Response filed Jun. 08, 2012 to Non Final Office Action mailed Dec. 08, 2011", 11 pgs.
"U.S. Appl. No. 13/347,529, Non Final Office Action mailed Jul. 12, 2012", 9 pgs.
"U.S. Appl. No. 13/347,529, Response filed Jun. 22, 2012 to Restriction Requirement mailed Jun. 20, 2012", 8 pgs.
"U.S. Appl. No. 13/347,529, Restriction Requirement mailed Jun. 20, 2012", 6 pgs.--, therefore In the Specification In column 2, line 38, before ""merchandising", insert --a--, therefore Signed and Sealed this
Second Day of December, 2014

Michelle K. Lee
*Deputy Director of the United States Patent and Trademark Office*

CERTIFICATE OF CORRECTION (continued)
U.S. Pat. No. 8,271,357 B2

In column 3, line 36, delete "6=500" and insert --6 × 500--, therefore

In column 7, line 54, after "marketplace", insert --.--, therefore

In the Claims

In column 18, line 12, in claim 5, after "that", delete "when", therefore